(12) United States Patent
Floyd

(10) Patent No.: US 11,682,081 B1
(45) Date of Patent: *Jun. 20, 2023

(54) SYSTEMS AND METHODS FOR GENERATING USAGE-BASED INSURANCE CONTRACTS FOR PEER-TO-PEER TRANSACTIONS

(71) Applicant: State Farm Mutual Automobile Insurance Company, Bloomington, IL (US)

(72) Inventor: Matt Floyd, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 288 days.

This patent is subject to a terminal disclaimer.

(21) Appl. No.: 17/071,773

(22) Filed: Oct. 15, 2020

Related U.S. Application Data

(63) Continuation of application No. 15/583,407, filed on May 1, 2017, now Pat. No. 10,832,335.

(51) Int. Cl.
G06Q 40/00 (2023.01)
G06Q 40/08 (2012.01)
G06Q 30/0601 (2023.01)

(52) U.S. Cl.
CPC ......... *G06Q 40/08* (2013.01); *G06Q 30/0609* (2013.01); *G06Q 30/0611* (2013.01)

(58) Field of Classification Search
CPC . G06Q 40/08; G06Q 30/0609; G06Q 30/0611
See application file for complete search history.

(56) References Cited

U.S. PATENT DOCUMENTS

| 8,266,031 | B2 | 9/2012 | Norris et al. |
| 8,359,259 | B2 | 1/2013 | Berg et al. |
| 8,768,565 | B2 | 7/2014 | Jefferies et al. |
| 9,396,494 | B1 | 7/2016 | Saenglongma |
| 9,495,709 | B2 | 11/2016 | Borden et al. |

(Continued)

FOREIGN PATENT DOCUMENTS

| DE | 102016225285 A1 | 6/2018 |
| KR | 2013047915 A | 5/2013 |

(Continued)

OTHER PUBLICATIONS

Gerry Finley, "Sharing Economy: Challenges and Insurance Implications," Casualty Actuarial Society Reinsurance Seminar, Jun. 6, 2016, Munich RE (Year: 2016).*

(Continued)

*Primary Examiner* — Abhishek Vyas
*Assistant Examiner* — William B. Bunker
(74) *Attorney, Agent, or Firm* — Armstrong Teasdale LLP

(57) ABSTRACT

A system for generating and managing usage-based insurance contracts configured to (i) store a plurality of offers for sharing transactions, where each of the plurality of offers includes an item being offered and an associated offerer; (ii) receive a selection from a buyer of an offer that is accepted by the buyer of the plurality of offers; (iii) automatically generate a usage-based insurance contract for the sharing transaction based on the offer; and (iv) transmit the insurance contract to at least one of the buyer and the associated offerer.

20 Claims, 6 Drawing Sheets

(56) References Cited

U.S. PATENT DOCUMENTS

| | | | |
|---|---|---|---|
| 10,109,016 B1* | 10/2018 | Saenglongma | G06Q 40/08 |
| 10,664,917 B1 | 5/2020 | Wasserman | |
| 10,755,327 B2* | 8/2020 | Nagla | H04L 9/3247 |
| 10,891,686 B1* | 1/2021 | Rao | G06Q 40/08 |
| 2011/0213629 A1 | 9/2011 | Clark et al. | |
| 2012/0330696 A1 | 12/2012 | Clark et al. | |
| 2015/0039366 A1* | 2/2015 | Haque | G06Q 10/063112 |
| | | | 705/7.14 |
| 2015/0278943 A1 | 10/2015 | Krishnamurthy et al. | |
| 2016/0155110 A1 | 6/2016 | Wright et al. | |
| 2016/0189304 A1* | 6/2016 | Todasco | G06Q 40/08 |
| | | | 705/4 |
| 2016/0217532 A1 | 7/2016 | Slavin | |
| 2016/0371787 A1 | 12/2016 | Rackley et al. | |
| 2016/0371788 A1 | 12/2016 | Rackley et al. | |
| 2017/0046664 A1* | 2/2017 | Haldenby | G06Q 10/0631 |
| 2017/0053460 A1 | 2/2017 | Hauser et al. | |
| 2018/0047106 A1 | 2/2018 | Snyder et al. | |
| 2018/0075380 A1* | 3/2018 | Perl | G06Q 50/30 |
| 2018/0321051 A1 | 11/2018 | Tennent et al. | |
| 2019/0126935 A1* | 5/2019 | Phillips | G07C 5/0808 |

FOREIGN PATENT DOCUMENTS

| | | | | |
|---|---|---|---|---|
| WO | WO-2011109301 A1 * | 9/2011 | | G06Q 10/02 |
| WO | 2014105791 A1 | 7/2014 | | |
| WO | 2016028228 A1 | 2/2016 | | |
| WO | 2017053047 A1 | 3/2017 | | |
| WO | 2018046102 A1 | 3/2018 | | |

OTHER PUBLICATIONS

Anonymous, "4 Peer-to-Peer Companies to Use on your Next Vacation," https://www.parqex.com, 2016 (Year: 2016).*

Wan et al., "PRIDE: A Private and Decentralized Usage-Based Insurance Using Blockchain," IEEE Conference on Internet of Things, Green Computing and Communications, Cyber, Physical and Social Computing, Smart Data, Blockchain, Computer and Information Technology, Congress on Cybermatics, 2018 (Year: 2018).*

Norton Rose Fulbright, "The future of smart contracts in insurance," https://www.nortonrosefulbright.com, 2016 (Year: 2016).*

Peter Handel et al., "Smartphone-Based Measurement Systems for Road Vehicle Traffic Monitoring and Usage-Based Insurance," IEEE Systems Journal, vol. 8, No. 4 (Year: 2014).

Ester Val, "Meet the insurers of the sharing economy," https://web.archive.org/web/20170306105940 (Year: 2017; Updated: 2020).

Gerry Finley, "Sharing Economy: Challenges and Insurance Implications," Munich RE, Casualty Actuarial Society Reinsurance Seminar (Year: 2016).

* cited by examiner

SYSTEMS AND METHODS FOR GENERATING USAGE-BASED INSURANCE CONTRACTS FOR PEER-TO-PEER TRANSACTIONS

CROSS-REFERENCE TO RELATED APPLICATIONS

This application is a continuation of U.S. patent application Ser. No. 15/583,407, filed May 1, 2017, entitled "SYSTEMS AND METHODS FOR GENERATING USAGE-BASED INSURANCE CONTRACTS FOR PEER-TO-PEER TRANSACTIONS" the entire contents and disclosure of which are hereby incorporated herein by reference in their entirety.

FIELD OF THE INVENTION

The present disclosure relates to generating usage-based insurance contracts and, more particularly, to a network-based system and method for generating and managing usage-based insurance contracts for peer-to-peer transactions using blockchain technologies.

BACKGROUND

Peer-to-peer commerce systems (also known as sharing economy systems) allow individuals to exchange services with other individuals. In some transactions, there may be a need to insure the item being shared for the length of the transaction. Usage-based insurance (UBI) contracts are short-term contracts that allow an individual to pay for insurance as they need it. In many cases, this insurance is based upon the combination of the user and the purpose for the insurance. There exists a need for a system and method that are configured to securely validate individuals in a peer-to-peer commerce system, while being able to insure those involved in a peer-to-peer commerce transaction.

BRIEF SUMMARY

In one aspect, a computer system for generating usage-based insurance contracts is provided. The computer system includes at least one processor in communication with at least one memory device. The at least one processor is programmed to store a plurality of offers for sharing transactions. Each of the plurality of offers includes an item being offered and an associated offerer. The at least one processor is also programmed to receive a selection from a buyer of an offer that is accepted by the buyer of the plurality of offers, automatically generate a usage-based insurance contract for the sharing transaction based on the offer, and transmit the insurance contract to at least one of the buyer and the associated offerer to facilitate quickly and accurately providing appropriate insurance coverage for sharing transactions. The computer system may have additional, less, or alternate functionality, including that discussed elsewhere herein.

In another aspect, a computer-based method for generating usage-based insurance contracts is provided. The method is implemented on a usage-based insurance management ("UBIM") computing device that includes at least one processor in communication with at least one memory device. The method includes storing, within the at least one memory device, a plurality of offers for sharing transactions. Each of the plurality of offers includes an item being offered and an associated offerer. The method also includes receiving by the at least one processor a selection from a buyer of an offer that is accepted by the buyer of the plurality of offers, generating by the at least one processor a usage-based insurance contract for the sharing transaction based on the offer, and transmitting the insurance contract to at least one of the buyer and the associated offerer to facilitate quickly and accurately providing appropriate insurance coverage for sharing transactions. The method may have additional, less, or alternate functionality, including that discussed elsewhere herein.

In yet another aspect, at least one non-transitory computer-readable storage media having computer-executable instructions embodied thereon is provided. When executed by at least one processor, the computer-executable instructions cause the processor to store a plurality of offers for sharing transactions. Each of the plurality of offers includes an item being offered and an associated offerer. The computer-executable instructions also cause the processor to receive a selection from a buyer of an offer that is accepted by the buyer of the plurality of offers, automatically generate a usage-based insurance contract for the sharing transaction based on the offer, and transmit the insurance contract to at least one of the buyer and the associated offerer to facilitate quickly and accurately providing appropriate insurance coverage for sharing transactions. The storage media may have additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
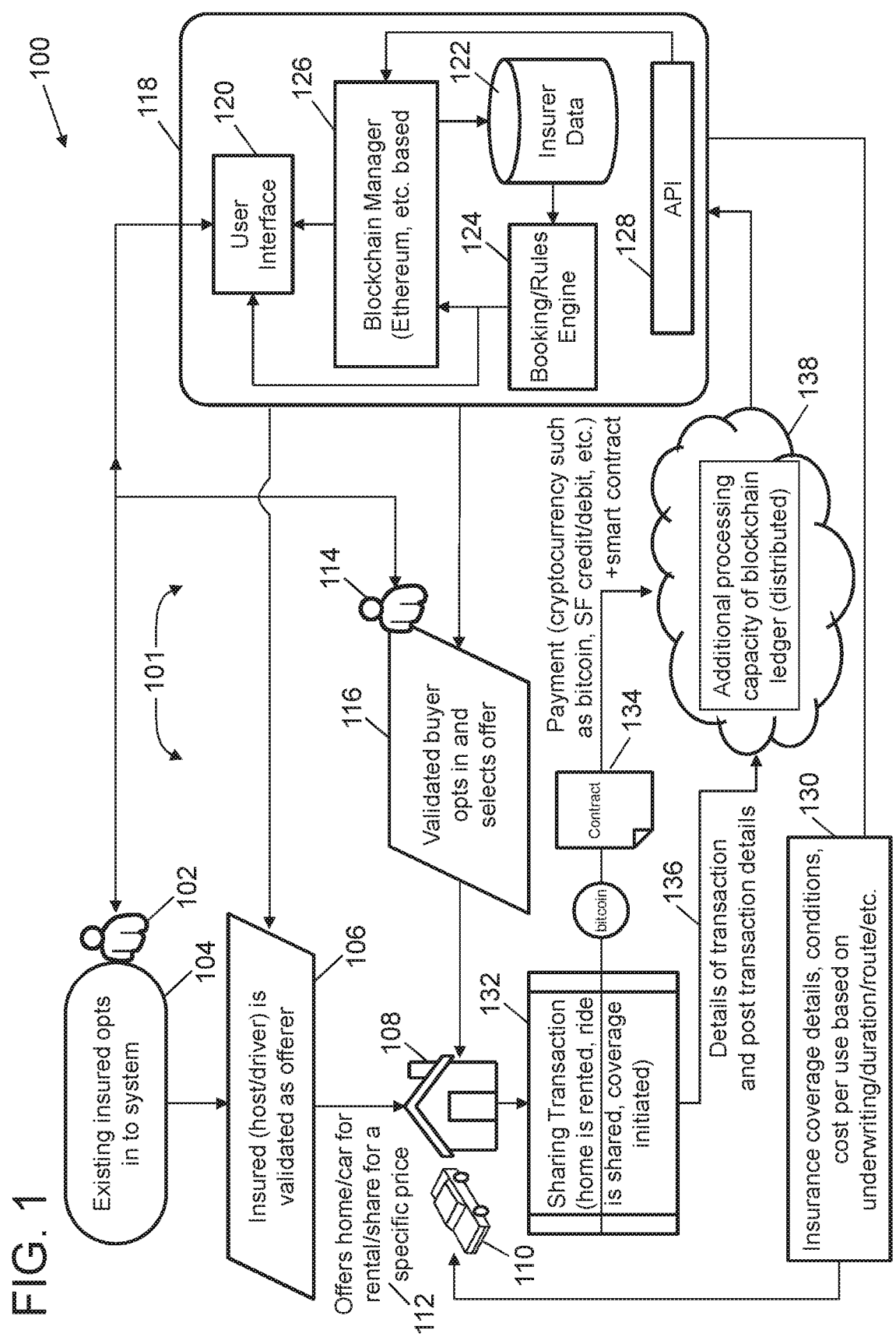
FIG. 1 illustrates a flow chart of an exemplary process of generating and managing usage-based insurance for a sharing economy transaction.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for generating and managing usage-based insurance (UBI) contracts. In at least one embodiment, these UBI contracts are managed using blockchains. In one exemplary embodiment, the process may be performed by a usage based insurance management ("UBIM") computer device associated with an insurance provider, also known as a usage based insurance management ("UBIM") server.

A blockchain is a distributed database that maintains a continuously-growing list of ordered records, known as blocks. Each block may contain at least a timestamp and a link to the previous block in the chain. The link to the previous block may be a hash of the previous block. For example, in the case of an insurance contract, the first block may contain the initial contract between a driver and an insurer. The second block may contain a modification to the contract that was requested by the driver and approved by the insurer. The second block may contain a hashed copy of the first block as well. The third block may contain one or more additional terms for the insurance contract and a hashed copy of the second block. This continues on with each block adding on to the next while containing a hash of the previous blocks in the blockchain.

To ensure the security of the information contained in the blockchain, copies of the blockchain may be distributed across multiple computer devices, known as nodes. These nodes maintain the blockchain, update the blockchain when changes occur, and ensure the stability of the blockchain itself. In some embodiments, nodes may also be used to calculate the hash of the previous blocks. As the blockchain grows, the processing power needed to calculate the hash of the previous blocks grows as well. In these embodiments, the processing of the hash may be distributed over multiple computer devices to improve the speed of processing and/or to not overburden the hashing processor. When a node processes (hashes) a block, that node is known as a miner, where the action of validating and hashing the block is also known as mining.

Peer-to-peer commerce systems (also known as sharing economy systems) allow for the exchange of goods and/or services on an individual basis, so that individuals are exchanging the goods and/or services with other individuals. Examples of these exchanges, include but are not limited to online auctions, online classifieds, ride sharing, residence sharing, vehicle sharing, commute sharing, and travel sharing. In most sharing economy systems, a list of individuals that are willing to offer a service, such as a car ride or a residence rental, list their proposed transaction on a website or other online platform. In the exemplary embodiment, the offerer lists the item that he or she wishes to offer along with the price, and/or conditions for the exchange. In the example of the residence sharing, the offerer may include pictures of the residence, a listing of the amenities of the residence, a cost to rent the residence per night and/or per week, conditions, such as minimum stay and/or whether or not pets are allowed.

A potential buyer may browse through the listings of offers to determine which offer is most appropriate for them. The potential buyer selects an offer and the offerer is informed. Information about the offerer and buyer is exchanged, and payment is made.

In the exemplary embodiment, an insurance provider is connected to a sharing economy system, such as, but not limited to, a ride-sharing, a car-sharing, and/or a residence-sharing system. In some embodiments, the sharing economy system is hosted by the insurance provider. In other embodiments, the sharing economy system is separate from the insurance provider, and the insurance provider is in communication with the sharing economy system.

In the exemplary embodiment, an offerer is preparing to offer a potential transaction through the sharing economy system. In the exemplary embodiment, the offerer is already insured by the insurance provider. The offerer opts in or signs up for the sharing economy system. In the exemplary embodiment, the offerer communicates their desire to opt in to the usage based insurance management ("UBIM") server through a user interface. In the exemplary embodiment, the UBIM server is associated with the insurance provider that insures the offerer. The UBIM server retrieves insurer data about the offerer (already collected as part of the insurer already proving insurance, or additionally collected) and inputs the retrieved insurer data into a booking/rules engine to validate the offerer. In the exemplary embodiment, the insurer data includes data about the offerer based on offerer's insurance policies with the insurance provider. In some further embodiments, the insurer data may also include additional data about the items to be offered, such as the offerer's residence and/or car, which may also be covered by an insurance policy from the insurance provider. Examples of offers include, but are not limited to, residence rental (where the offerer's residence is being offered for rent for a period of time), vehicle ride (where the offerer is offering to drive the buyer from one point to another point), and/or a vehicle rental (wherein offerer's vehicle is being offered for use for a period of time).

The residence may include, but is not limited to, a house, an apartment, a townhouse, a condominium, a guest house, a mobile home, a shared room, a couch in a living room, and/or any other place to stay. The vehicle may include, but is not limited to, an automobile, a boat, an aircraft, a bicycle, a motorcycle, a recreational vehicle, and/or any other vehicle. In the exemplary embodiment, the offerer offers his/her residence or vehicle to share for a specific price. The offer is listed within the UBIM server among a plurality of other offers by a plurality of other offerers. In some embodiments, the listings are stored and displayed by the UBIM server. In the exemplary embodiment, for security reasons, an offerer is not allowed to post an offer until the offerer is validated by the UBIM server.

In the exemplary embodiment, a buyer opts in and signs up for the sharing economy system. In some embodiments, the buyer is also insured by the insurance provider. In these embodiments, the UBIM server validates the buyer prior to the buyer being able to sign up for the sharing economy system. The UBIM server validates the buyer based on information in the insurer data and the rules engine. In other embodiments, the buyer is not insured by the insurance provider. In these embodiments, the UBIM server may attempt to validate the buyer based on buyer provided information.

Once signed up and validated, the buyer may browse the plurality of offers included within the UBIM server. In the exemplary embodiment, the plurality of offers is hosted on an online application. As such, the application may be a web-hosted application or mobile application that allows the buyer to browse and/or search through the listings of offers. When the buyer selects an offer, a notification is sent to the offerer and the item in the offer is rented to the buyer.

In preparation for renting the item, the UBIM server generates an insurance policy for the transaction. In the exemplary embodiment, the UBIM server retrieves information about the offerer, the item, the offer, and the buyer. Using the booking/rules engine, the UBIM server analyzes the retrieved information to generate the insurance policy for the transaction. The UBIM server offers the generated insurance policy to at least one of the offerer and the buyer. In some embodiments, multiple insurance policies are generated, such as one for each participant in the transaction. In some further embodiments, insurance policies with different levels of coverage are offered. In still further embodiments, the insurance policy coverage is automatically activated, where the offerer has paid an extra premium on the pre-existing policy to cover some or all of the sharing transactions.

In the exemplary embodiment, when the transaction has begun, the insurance coverage also begins to cover at least one of the participants and the item being shared. In some embodiments, a smart contract is generated. The smart contract includes at least one of details of the transaction, any restrictions on the transaction, details of the insurance policy covering the transaction, and payment, such as crypto payment or payment card information. In the exemplary embodiment, the smart contract may be stored in a blockchain ledger that is distributed among a plurality of participants (also known as nodes). The nodes may be capable of communicating with the UBIM server though an application programming interface (API). In the exemplary embodiment, the UBIM server may include a firewall (not shown) to protect the private information of the offerer and the buyer.

In the exemplary embodiment, each smart contract may be stored in its own blockchain ledger. As the smart contract is modified or additional information is added to the smart contract, such as upon completion of the transaction, another block may be added to the blockchain of the smart contract.

In some further embodiments, the private information may be only stored by the UBIM server and not stored in the blockchain ledger. The blockchain ledger may also store details of the transaction, where the details may include both transaction details and post transaction details. One example of post transaction details would be an indication of whether any claims were made against the insurance policy by either the offerer or the buyer. These post transaction details may be stored in the insurer data to be used for validating the offerer and the buyer, respectively.

At least one of the technical problems addressed by this system may include: (i) improving speed and accuracy of issuing an insurance policy (usage-based policy) for a sharing economy transaction; (ii) operating a sharing economy platform, where all of the offerers have been validated by a third party; (iii) validating the buyers of the sharing economy transactions by the third party; (iv) improving the online security of the sharing economy transactions through the blockchain technology; and/or (v) constantly improving the accuracy of data used to make insurance decisions about usage based insurance for sharing economy transactions.

The methods and systems described herein may be implemented using computer programming or engineering techniques including computer software, firmware, hardware, or any combination or subset thereof, wherein the technical effects may be achieved by performing at least one of the following steps: (a) store a plurality of offers for sharing transactions, where each of the plurality of offers includes an item being offered and an associated offerer, where each offerer is associated with a single insurance provider, and where an offer is at least one of a residence rental, a vehicle ride, and a vehicle rental; (b) receive a proposed offer from a prospective offerer, where the proposed offer includes information about the proposed offer including an existing insurance contract for at least one of the item being offered and the prospective offerer; (c) validate the offerer based at least in part on the existing insurance contract; (d) add the proposed offer to the plurality of offers; (e) receive information about a prospective buyer including an existing insurance contract for the prospective buyer; (f) validate the prospective buyer based at least in part on the existing insurance contract; (g) transmit the plurality of offers to a computer device associated with the validated prospective buyer, where the computer device is configured to display at least a portion of the list of offers to the validated prospective buyer; (h) receive a selection from a buyer of an offer accepted by the buyer of the plurality of offers; (i) generate an insurance policy for the sharing transaction based on the offer, where the insurance provider is associated with the generated insurance contract; (j) transmit the insurance policy to at least one of the buyer and the associated offerer; (k) generate a contract for the sharing transaction based on the offer, the associated offerer, and the buyer, wherein the contract is in a blockchain structure, and wherein a plurality of nodes store copies of the contract in the blockchain structure; (l) store the details of the sharing transaction in the blockchain structure; (m) store the post transaction details of the sharing transaction.

Exemplary Process for Managing Usage-Based Insurance

FIG. 1 illustrates a flow chart of an exemplary computer-implemented process 100 for generating and managing usage-based insurance for a sharing economy transaction. In the exemplary embodiment, an insurance provider is connected to a sharing economy system 101, such as, but not limited to, a ride-sharing, a car-sharing, and/or a residence-sharing system. In some embodiments, sharing economy system 101 is hosted by the insurance provider. In other embodiments, sharing economy system 101 is separate from the insurance provider, and the insurance provider is in communication with sharing economy system 101.

In the exemplary embodiment, an offerer 102 is preparing to offer a potential transaction through sharing economy system 101. In the exemplary embodiment, offerer 102 is already insured by the insurance provider. Offerer 102 opts in 104 or signs up for sharing economy system 101. In the exemplary embodiment, offerer 102 communicates the desire to opt in 104 to usage based insurance management ("UBIM") server 118 through a user interface 120. In the exemplary embodiment, UBIM server 118 is associated with the insurance provider that insures offerer 102. UBIM server 118 retrieves insurer data 122 about offerer 102 and inputs the retrieved insurer data 122 into a booking/rules engine 124 to validate 106 offerer 102. In the exemplary embodiment, insurer data 122 includes data about offerer 102 based on offerer's insurance policies with insurance provider. In some further embodiments, insurer data 122 also includes additional data about the items to be offered, such as the offerer's residence 108 and/or car 110, which may also be covered by an insurance policy from insurance provider. Examples of offers 112 include, but are not limited to, residence rental (where offerer's residence 108 is being offered for rent for a period of time), vehicle ride (where offerer 102 is offering to drive a buyer 114 from one point to another point), and a vehicle rental (wherein offerer's vehicle 110 is being offered for use for a period of time).

The residence 108 may include, but is not limited to, a house, an apartment, a townhouse, a condominium, a guest house, a mobile home, a shared room, a couch in a living room, and/or any other place to stay. The vehicle 110 may include, but is not limited to, an automobile, a boat, an aircraft, a bicycle, a motorcycle, a recreational vehicle, and/or any other vehicle. In the exemplary embodiment, offerer 102 offers 112 his/her residence 108 or vehicle 110 to share for a specific price. The offer 112 is listed among a plurality of other offers by a plurality of other offerers 102. In some embodiments, the listings are stored and displayed by UBIM server 118. In the exemplary embodiment, for security reasons, an offerer 102 is not allowed to post an offer 112 until the offerer 102 is validated 106 by UBIM server 118.

In the exemplary embodiment, a buyer 114 opts in 116 and signs up for sharing economy system 101. In some embodiments, buyer 114 is also insured by the insurance provider. In these embodiments, UBIM server 118 validates buyer 114 prior to buyer 114 being able to sign up for sharing economy system 101. UBIM server 118 validates buyer 114 based on information in insurer data 122 and rules engine 124. In other embodiments, buyer 114 is not insured by insurance provider. In these embodiments, UBIM server 118 may attempt to validate buyer 114 based on buyer provided information.

Once signed up and validated, buyer 114 may browse the plurality of offers 112. In the exemplary embodiment, the plurality of offers 112 are hosted on an online application. As such, the application may be a web-hosted application or mobile application that allows buyer 114 to browse and/or search through the listings of offers 112. When buyer 114 selects 116 an offer 112, a notification is sent to offerer 102 and the item 108/110 in offer 112 is rented 132 to buyer 114.

In preparation for renting 132 item 108/110, UBIM server 118 generates 130 an insurance policy for the transaction. In the exemplary embodiment, UBIM server 118 retrieves information about offerer 102, item 108/110, offer 112, and buyer 114. Using booking/rules engine 124, UBIM server 118 analyzes the retrieved information to generate the insurance policy for the transaction. UBIM server 118 offers the generated insurance policy to at least one of offerer 102 and buyer 114. In some embodiments, multiple insurance policies are generated 130, such as one for each participant in the transaction. In some further embodiments, insurance policies with different levels of coverage are offered. In still further embodiments, the insurance policy coverage is automatically activated, where the offerer 102 has paid an extra premium on the pre-existing policy to cover some or all sharing transactions.

In the exemplary embodiment, when the transaction has begun 132, the insurance coverage also begins to cover at least one of the participants and the item being shared 108/110. In some embodiments, a smart contract 134 is generated. Smart contract 134 includes at least one of details of the transaction, any restrictions on the transaction, details of the insurance policy covering the transaction, and payment, such as crypto payment or payment card information. In the exemplary embodiment, smart contract 134 may be stored in a blockchain ledger 138 that is distributed among a plurality of participants (also known as nodes). The nodes may be capable of communicating with UBIM server 118 though an application programming interface (API) 128. In the exemplary embodiment, UBIM server 118 may include a firewall (not shown) to protect the private information of offerer 102 and buyer 114.

In the exemplary embodiment, each smart contract 134 may be stored in its own blockchain ledger 138. As the smart contract 134 is modified or additional information is added to smart contract 134, such as upon completion of the transaction, another block may be added to the blockchain of smart contract 134.

In some further embodiments, the private information may only be stored by UBIM server 118 and not stored in blockchain ledger 138. Blockchain ledger 138 may also store details of the transaction 136, where the details may include both transaction details and post transaction details. One example of post transaction details would be an indication of whether any claims were made against the insurance policy by either offerer 102 or buyer 114. These post transaction details may be stored in insurer data 122 to be used for validating 106/116 offerer 102 and buyer 114, respectively.

Exemplary Computer-Implemented Method for Managing Usage-Based Insurance

Figure 2:
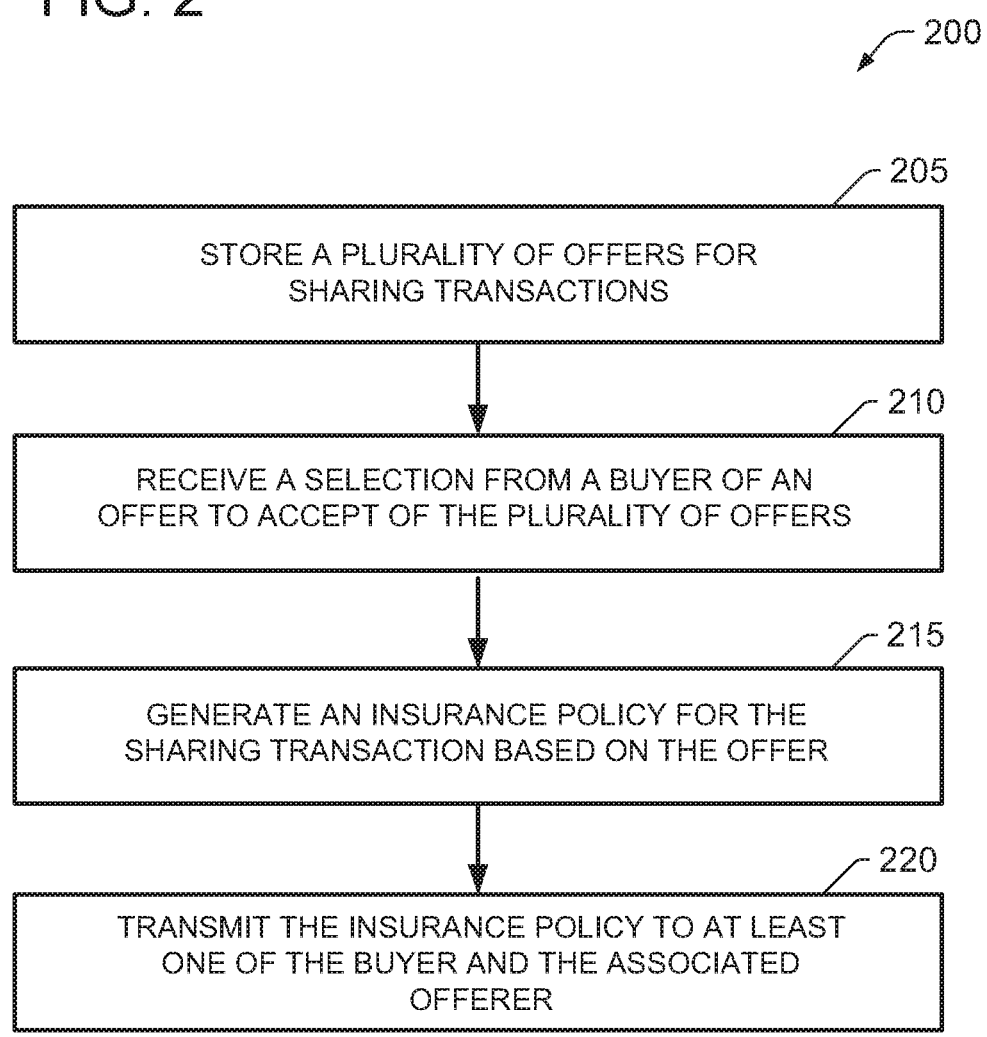
FIG. 2 illustrates a flow chart of an exemplary computer-implemented process for generating and managing usage-based contracts as shown in FIG. 1.

FIG. 2 illustrates a flow chart of an exemplary computer implemented process 200 for generating and managing usage-based insurance contracts using process 100 shown in FIG. 1. Process 200 may be implemented by a computing device, for example usage based insurance management ("UBIM") server 118 (shown in FIG. 1) or UBIM server 310 (shown in FIG. 3). In the exemplary embodiment, UBIM computer device 310 may be in communication with an offerer computer device 305 (shown in FIG. 3), a buyer computer device 325 (shown in FIG. 3), a user computer device 335 (shown in FIG. 3), and a plurality of nodes 330 (shown in FIG. 3) for the blockchain ledger 138 (shown in FIG. 1).

In the exemplary embodiment, UBIM computer device 310 may store 205 a plurality of offers 112 (shown in FIG. 1) for sharing transactions. Each of the plurality of offers 112 includes an item being offered 108 & 110 (both shown in FIG. 1) and an associated offerer 102 (shown in FIG. 1). Examples of offers 112 include, but are not limited to, residence rental (where offerer's residence 108 is being offered for rent for a period of time), vehicle ride (where offerer 102 is offering to drive buyer 114 from one point to another point), and a vehicle rental (wherein offerer's vehicle 110 is being offered for use for a period of time). The residence 108 may include, but is not limited to, a house, an apartment, a townhouse, a condominium, a guest house, a mobile home, a shared room, a couch in a living room, and/or any other place to stay. The vehicle 110 may include, but is not limited to, an automobile, a boat, an aircraft, a bicycle, a motorcycle, a recreational vehicle, and/or any other vehicle.

Each offerer 102 is associated with insurance provider. In the exemplary embodiment, the insurance provider associated with offerer 102 is the same insurance provider associated with UBIM server 310. In some further embodiments, UBIM server 310 is associated with multiple insurance providers and offerer 102 is associated with one of the insurance providers associated with UBIM server 310.

In the exemplary embodiment, UBIM server 310 receives 210 a selection 116 from buyer 114 of an offer 112 to accept of the plurality of offers 112. In some embodiments, UBIM server 310 receives 210 the selection 116 from buyer computer device 325, where buyer 114 input selection 116 into buyer computer device 325.

Based on the selection 116, UBIM server 310 generates 215 an insurance policy for the selected transaction. In the exemplary embodiment, the insurance policy covers the sharing transaction from the beginning of the transaction to the completion of the transaction. For example, for a house rental transaction, the insurance contract covers damage to the residence 108 and the residence's contents during the sharing transaction. For a ride sharing transaction, the insurance contract covers damage to the vehicle 110, the driver, and/or the passengers during the ride sharing transaction. In some embodiments, the insurance contract covers replacement services, such as if the residence 108 burns down between acceptance of the offer and initiation of the buyer's stay in the residence 108. In the exemplary embodiment, the insurance contract is associated with the insurance provider associated with UBIM server 310.

UBIM server 310 transmits the generated insurance policy to at least one of offerer 102 and buyer 114. In the exemplary embodiment, at least one of the recipients accepts and pays for the insurance contract. In some embodiments, buyer 114 pays for both the insurance contract and the sharing transaction in the same payment.

In some embodiments, UBIM server 310 stores and manages the plurality of offers 112. In these embodiments, UBIM server 310 receives a proposed offer 112 from a prospective offerer 102. The proposed offer 112 includes information about the existing insurance contract between insurance provider and prospective offerer 102. In some embodiments, the existing insurance contract covers the item 108 & 110 being offered.

UBIM server 310 validates the prospective offerer 102, based, at least in part, on the existing insurance contract between offerer 102 and insurance provider. Once the offerer 102 is validated, UBIM server 310 adds the proposed offer 112 to the plurality of offers 112.

In some embodiments, UBIM server 310 receives receive information about a prospective buyer 114 including an existing insurance contract between the prospective buyer and the insurance provider. UBIM server 310 validates the prospective buyer 114 based at least in part on the existing insurance contract. In some embodiments, once the prospective buyer is validated 116, UBIM server 310 transmits the plurality of offers to a buyer computer device 325 associated with the validated prospective buyer 114. Buyer computer device 325 is configured to display at least a portion of the list of offers 112 to the validated prospective buyer 114.

In some embodiments, UBIM server 310 generates a contact for the sharing transaction, such as smart contract 134 (shown in FIG. 1). Smart contract 134 is based on the offer 112, the associated offerer 102, and the buyer 114. In some embodiments, smart contract 134 is stored in a blockchain structure, such as blockchain ledger 138. In some further embodiments, UBIM server 310 also stores transaction details and post transaction details in blockchain ledger 138.

Exemplary Computer Network

Figure 3:
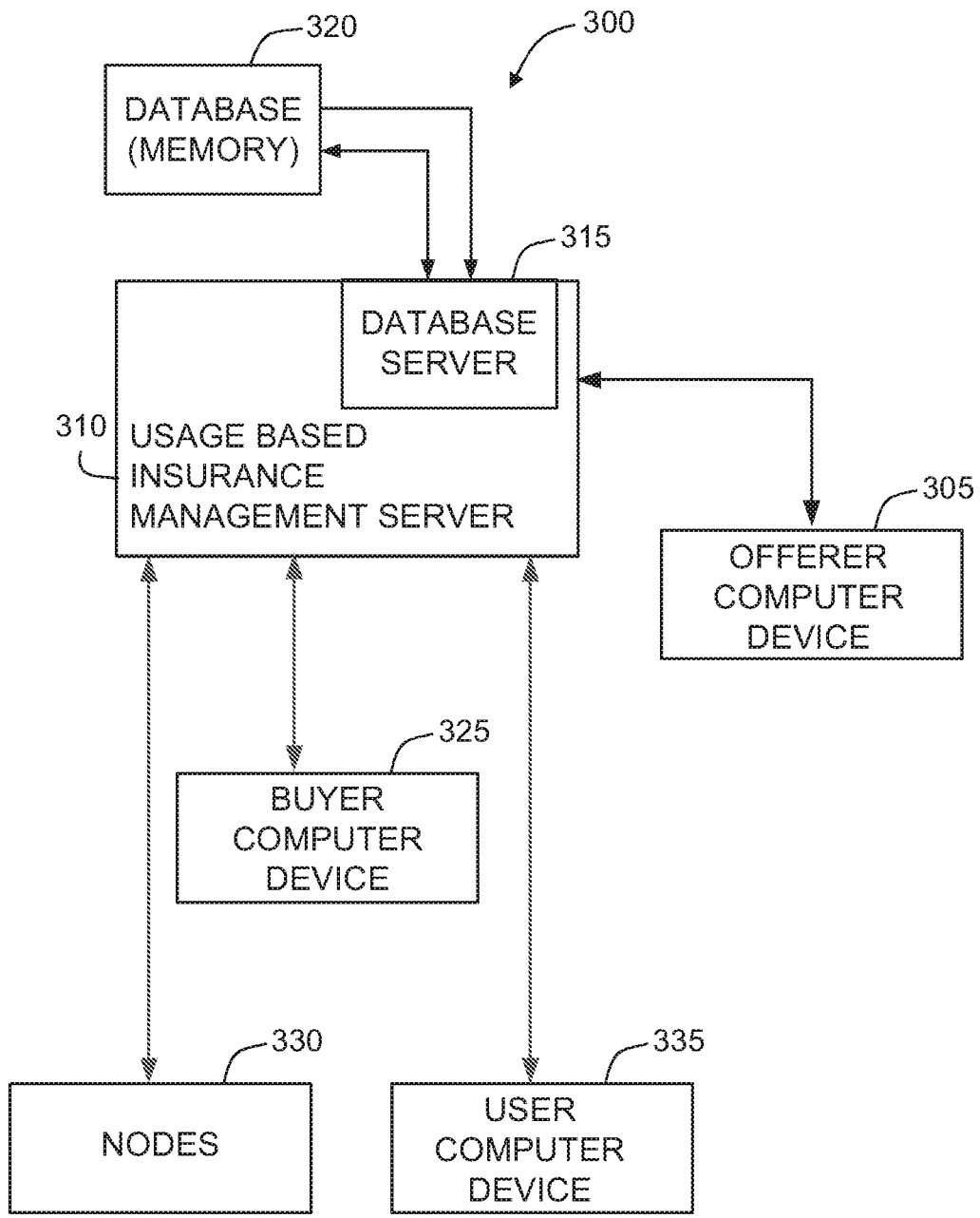
FIG. 3 illustrates a simplified block diagram of an exemplary computer system for implementing the process shown in FIG. 1 and the process shown in FIG. 2.

FIG. 3 depicts a simplified block diagram of an exemplary system 300 for implementing process 100 shown in FIG. 1 and process 200 shown in FIG. 2. In the exemplary embodiment, system 300 may be used for generating and managing usage-based insurance contracts. As described below in more detail, a usage based insurance management ("UBIM") server 310, which may be similar to UBIM server 118 (shown in FIG. 1) is configured to (i) store a plurality of offers 112 (shown in FIG. 1) for sharing transactions, wherein each of the plurality of offers 112 includes an item being offered (such as 108 and 110 shown in FIG. 1) and an associated offerer 102 (shown in FIG. 1); (ii) receive a selection from a buyer 114 (shown in FIG. 1) of an offer 112 to accept the offer of the plurality of offers 112; (iii) generate an insurance policy for the sharing transaction based on the offer 112; and (iv) transmit the insurance policy to at least one of the buyer 114 and the associated offerer 102.

In the exemplary embodiment, offerer computer devices 305 are computers that include a web browser or a software application, which enables offerer computer devices 305 to access remote computer devices, such as UBIM server 310, using the Internet or other network. More specifically, offerer computer devices 305 may be communicatively coupled to UBIM server 310 through many interfaces including, but not limited to, at least one of the Internet, a network, such as the Internet, a local area network (LAN), a wide area network (WAN), or an integrated services digital network (ISDN), a dial-up-connection, a digital subscriber line (DSL), a cellular phone connection, and a cable modem. Offerer computer devices 305 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, offerer computer device 305 is associated with offerer 102.

In the exemplary embodiment, buyer computer devices 325 are computers that include a web browser or a software application, which enables buyer computer devices 325 to access remote computer devices, such as UBIM server 310, using the Internet or other network. More specifically, buyer computer devices 325 may be communicatively coupled to UBIM server 310 through many interfaces including, but not limited to, at least one of the Internet, a network, such as the Internet, a local area network (LAN), a wide area network (WAN), or an integrated services digital network (ISDN), a dial-up-connection, a digital subscriber line (DSL), a cellular phone connection, and a cable modem. Buyer computer devices 325 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, buyer computer device 325 is associated with buyer 114.

In the exemplary embodiment, user computer devices 335 are computers that include a web browser or a software application, which enables user computer devices 335 to access remote computer devices, such as UBIM server 310, using the Internet or other network. More specifically, user computer devices 335 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer devices 335 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

A database server 315 may be communicatively coupled to a database 320 that stores data. In one embodiment, database 320 may include the plurality of offers 112, insurer data 122 (shown in FIG. 1), the smart contract 134 (shown in FIG. 1), and one or more business rules (which may be associated with booking/rules engine 124 shown in FIG. 1). In the exemplary embodiment, database 320 may be stored remotely from UBIM server 310. In some embodiments, database 320 may be decentralized. In the exemplary embodiment, a user, such as offerer 102, may access database 320 via offerer computer device 305 by logging onto UBIM server 310, as described herein.

Nodes 330 may be communicatively coupled with UBIM server 310 and with each other. In some embodiments, nodes 330 may be associated with, or is part of a computer network associated with an insurance provider, or in communication with the insurance provider's computer network (not shown). In other embodiments, nodes 330 may be associated with a third party and is merely in communication with the insurance provider's computer network. More specifically, each node 330 is communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Nodes 330 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, nodes 330 are configured to store blockchains and participate in the network of blockchain ledgers 138 (shown in FIG. 1).

UBIM server 310 may be in communication with a plurality of offerer computer devices 305, a plurality of buyer computer devices 325, a plurality of nodes 330, and a plurality of user devices 335 to offer a plurality of offers 112 for sharing transactions. Furthermore, in some embodiments, the plurality of nodes 330 may be configured in a network that allows the UBIM sever 310 to communicate changes to blockchains that the various nodes 330 are storing. In addition, UBIM server 310 may be a node of the network of blockchain ledgers 138. UBIM server 310 may also be a super node of the network of blockchain ledgers 138 and manage communications between the various nodes 330, such as through blockchain manager 126 (shown in FIG. 1). In some embodiments, UBIM server 310 may be associated with an insurance provider, or in communication with the insurance provider's computer network (not shown). In other embodiments, UBIM server 310 may be associated with a third party and is merely in communication with the insurance provider's computer network.

Exemplary Client Device

Figure 4:
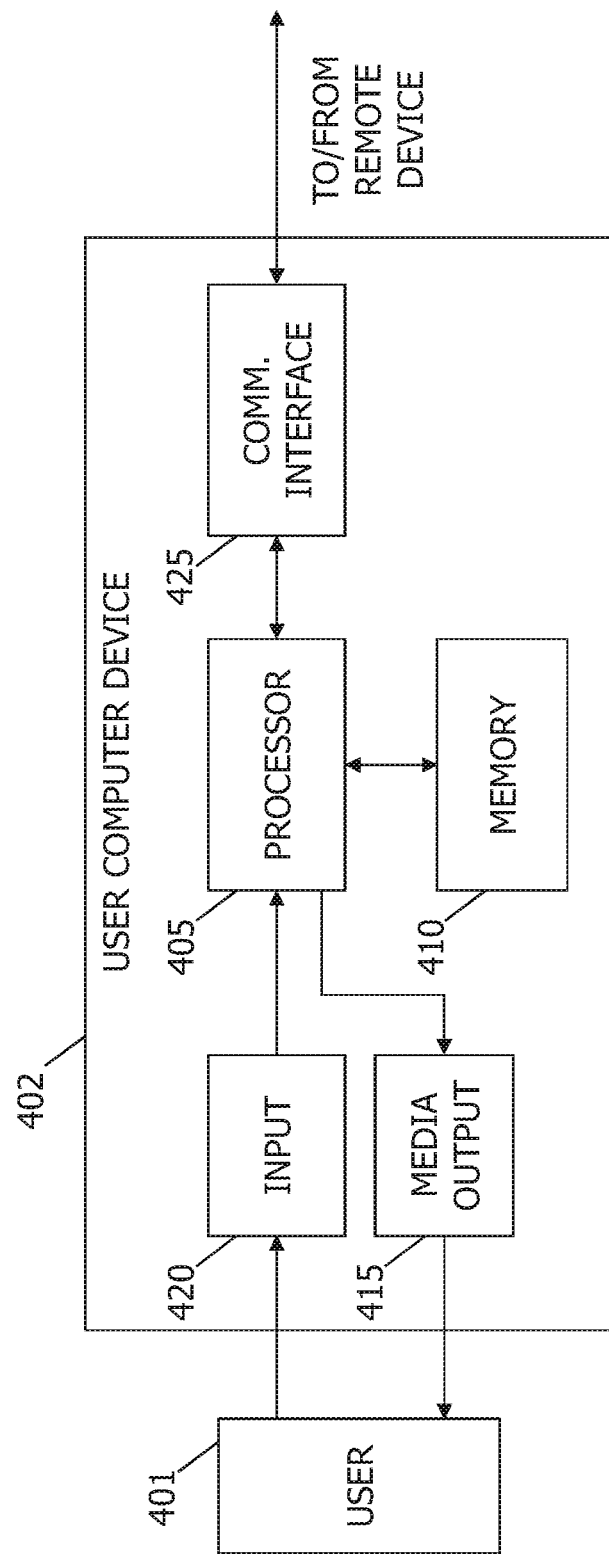
FIG. 4 illustrates an exemplary configuration of a client computer device, in accordance with one embodiment of the present disclosure.

FIG. 4 depicts an exemplary configuration of client computer device, in accordance with one embodiment of the present disclosure. User computer device 402 may be operated by a user 401. User computer device 402 may include, but is not limited to, offerer computer device 305, buyer computer device 325, nodes 330, and user computer devices 335 (all shown in FIG. 3). User computer device 402 may include a processor 405 for executing instructions. In some embodiments, executable instructions may be stored in a memory area 410. Processor 405 may include one or more processing units (e.g., in a multi-core configuration). Memory area 410 may be any device allowing information such as executable instructions and/or transaction data to be stored and retrieved. Memory area 410 may include one or more computer readable media.

User computer device 402 may also include at least one media output component 415 for presenting information to user 401. Media output component 415 may be any component capable of conveying information to user 401. In some embodiments, media output component 415 may include an output adapter (not shown) such as a video adapter and/or an audio adapter. An output adapter may be operatively coupled to processor 405 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 415 may be configured to present a graphical user interface (e.g., a web browser and/or a client application) to user 401. A graphical user interface may include, for example, an online store interface for viewing and/or selecting from the plurality of offers 112 (shown in FIG. 1). In some embodiments, user computer device 402 may include an input device 420 for receiving input from user 401. User 401 may use input device 420 to, without limitation, select an offer 112.

Input device 420 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 415 and input device 420.

User computer device 402 may also include a communication interface 425, communicatively coupled to a remote device such as UBIM server 310 (shown in FIG. 3). Communication interface 425 may include, for example, a wired or wireless network adapter and/or a wireless data transceiver for use with a mobile telecommunications network.

Stored in memory area 410 are, for example, computer readable instructions for providing a user interface to user 401 via media output component 415 and, optionally, receiving and processing input from input device 420. A user interface may include, among other possibilities, a web browser and/or a client application. Web browsers enable users, such as user 401, to display and interact with media and other information typically embedded on a web page or a website from UBIM server 310. A client application may allow user 401 to interact with, for example, UBIM server 310. For example, instructions may be stored by a cloud service, and the output of the execution of the instructions sent to the media output component 415.

Exemplary Server Device

Figure 5:
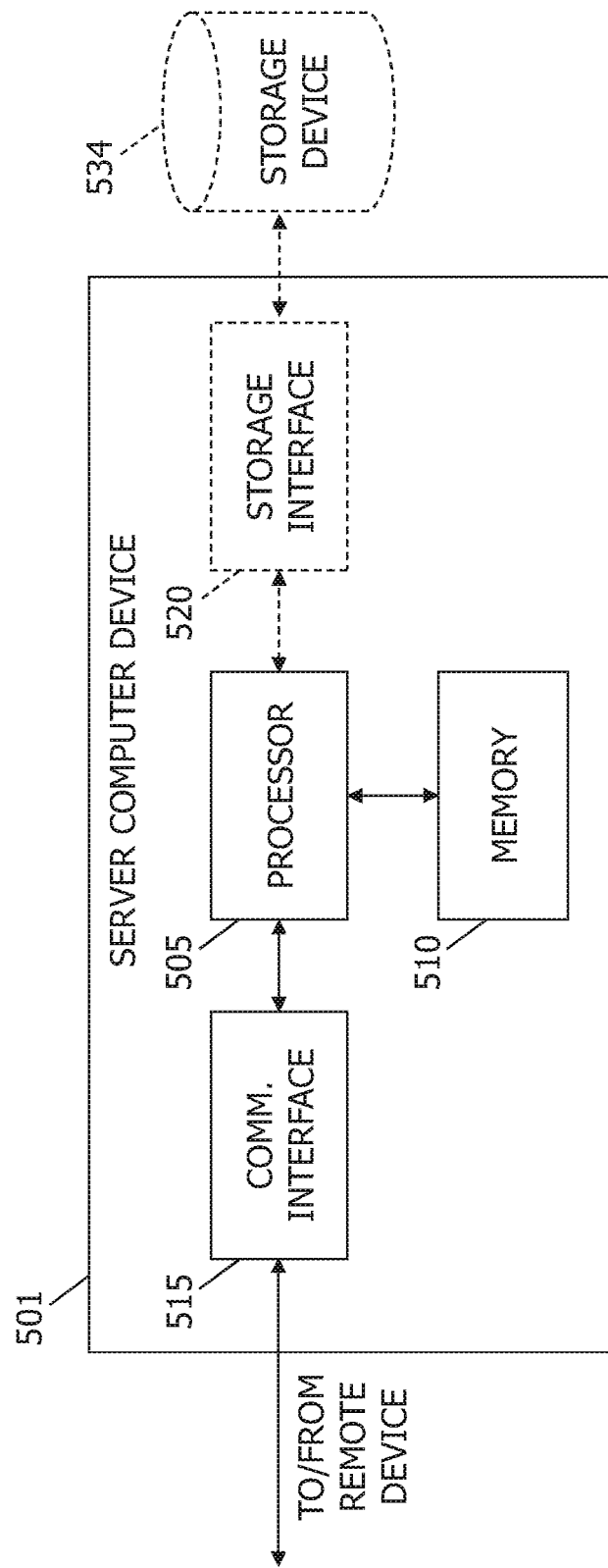
FIG. 5 illustrates an exemplary configuration of a server system, in accordance with one embodiment of the present disclosure.

FIG. 5 depicts an exemplary configuration of server system, in accordance with one embodiment of the present disclosure. Server computer device 501 may include, but is not limited to, UBIM server 118 (shown in FIG. 1), UBIM server 310, and database server 315 (both shown in FIG. 3). Server computer device 501 may also include a processor 505 for executing instructions. Instructions may be stored in a memory area 510. Processor 505 may include one or more processing units (e.g., in a multi-core configuration).

Processor 505 may be operatively coupled to a communication interface 515 such that server computer device 501 is capable of communicating with a remote device such as another server computer device 501, UBIM server 310, offerer computer device 305, buyer computer device 325, one or more nodes 330, and user computer device 335 (all shown in FIG. 3) (for example, using wireless communication or data transmission over one or more radio links or digital communication channels. For example, communication interface 515 may receive requests from user computer devices 335 via the Internet, as illustrated in FIG. 3.

Processor 505 may also be operatively coupled to a storage device 534. Storage device 534 may be any computer-operated hardware suitable for storing and/or retrieving data, such as, but not limited to, data associated with database 320 (shown in FIG. 3). In some embodiments, storage device 534 may be integrated in server computer device 501. For example, server computer device 501 may include one or more hard disk drives as storage device 534.

In other embodiments, storage device 534 may be external to server computer device 501 and may be accessed by a plurality of server computer devices 501. For example, storage device 534 may include a storage area network (SAN), a network attached storage (NAS) system, and/or multiple storage units such as hard disks and/or solid state disks in a redundant array of inexpensive disks (RAID) configuration.

In some embodiments, processor 505 may be operatively coupled to storage device 534 via a storage interface 520. Storage interface 520 may be any component capable of providing processor 505 with access to storage device 534. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 534.

Processor 505 may execute computer-executable instructions for implementing aspects of the disclosure. In some embodiments, the processor 505 may be transformed into a special purpose microprocessor by executing computer-executable instructions or by otherwise being programmed. For example, the processor 505 may be programmed with the instruction such as illustrated in FIG. 2.

Exemplary Computer Device

Figure 6:
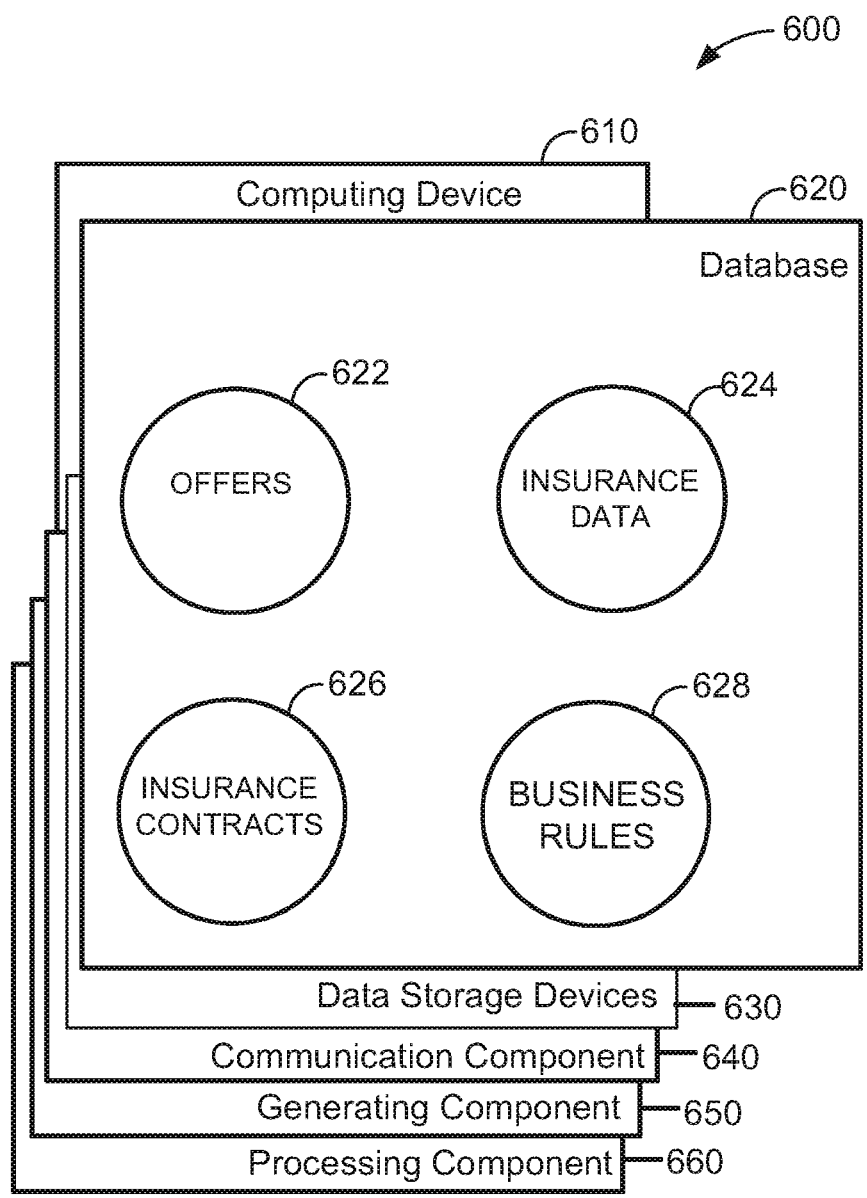
FIG. 6 illustrates a diagram of components of one or more exemplary computing devices that may be used in the system shown in FIG. 1 and the system shown in FIG. 3.

FIG. 6 depicts a diagram 600 of components of one or more exemplary computing devices 610 that may be used in process 100 shown in FIG. 1 and system 300 shown in FIG. 3. In some embodiments, computing device 610 may be similar to UBIM server 118 (shown in FIG. 1) and/or UBIM server 310 (both shown in FIG. 3). Database 620 may be coupled with several separate components within computing device 610, which perform specific tasks. In this embodiment, database 620 may include the plurality of offers 622 (which may be similar to offer 112 shown in FIG. 1), insurance data 624 (which may be similar to insurer data 122 shown in FIG. 1), the insurance contract 626 for the sharing transaction (which may be similar to smart contract 134 shown in FIG. 1), and one or more business rules 628 (which may be associated with booking/rules engine 124 shown in FIG. 1). In some embodiments, database 620 is similar to database 320 (shown in FIG. 3).

Computing device 610 may include the database 620, as well as data storage devices 630. Computing device 610 may also include a communication component 640 for receiving 210 a selection from a buyer and transmitting 220 the insurance policy (both shown in FIG. 2). Computing device 610 may further include a generating component 650 for generating 215 an insurance policy (shown in FIG. 2). A processing component 660 may assist with execution of computer-executable instructions associated with the system.

Exemplary Embodiments & Functionality

In one aspect, a computer system for generating and managing usage-based insurance contracts may be provided. The computer system may include at least one processor in communication with at least one memory device. The at least one processor may be configured or programmed to: (1) store a plurality of offers for sharing transactions, where each of the plurality of offers includes an item being offered and an associated offerer, where an offer is at least one of a residence rental, a vehicle ride, and a vehicle rental, and wherein each offerer is associated with the same single insurance provider; (2) receive a selection from a buyer of an offer to accept of the plurality of offers; (3) generate an insurance policy for the sharing transaction based on the offer, wherein the insurance provider is associated with the generated insurance contract; and (4) transmit the insurance policy to at least one of the buyer and the associated offerer.

A further enhancement may be where the computer system may receive a proposed offer from a prospective offerer. The proposed offer includes information about the proposed offer including an existing insurance contract for at least one of the item being offered and the prospective offerer. The computer system may then validate the offerer based at least in part on the existing insurance contract and add the proposed offer to the plurality of offers based on the validation.

The computer system may achieve the above results by receiving information about a prospective buyer including an existing insurance contract for the prospective buyer and validating the prospective buyer based at least in part on the existing insurance contract. The computer system may also transmit the plurality of offers to a computer device associated with the validated prospective buyer. The computer device is then configured to display at least a portion of the list of offers to the validated prospective buyer.

A further enhancement may be where the computer system may generate a contract for the sharing transaction based on the offer, the associated offerer, and the buyer. The contract is in a blockchain structure and a plurality of nodes store copies of the contract in the blockchain structure. The computer system may also store the details of the sharing transaction in the blockchain structure. The computer system may further store the post transaction details of the sharing transaction.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, vehicle telematics, autonomous vehicle, and/or intelligent home telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the computer device, the user of the computer device, driver and/or vehicle, home owner and/or home, buyer, geolocation information, image data, home sensor data, and/or other data.

Based upon these analyses, the processing element may learn how to identify characteristics and patterns that may then be applied to analyzing sensor data, authentication data, image data, mobile device data, and/or other data. For example, the processing element may learn, with the user's permission or affirmative consent, to predict suggestions for future sharing transactions to the buyer. The processing element may also learn how to identify different types of problems and/or issues with offers to assist the offerer based on transaction and post transaction details.

Exemplary Usage-Based Insurance Embodiments

The emerging field of sharing economy transactions risk presents challenges to insurers to quantify and thereby offer appropriately priced coverage to this sector. The competitive advantage lies in entering this market in its infancy and employing a usage-based insurance (UBI) solution to gather valuable data and gain actuarial experience in the sharing economy UBI market.

The UBI solution may require users to file for a policy and a quote for every individual transaction that the user plans. As the user only pays for the transactions that the user has performed, the user is only paying for insurance on the shared commodity when that commodity is actively being shared. In some embodiments, the UBI solution may also be known as a "pay as you go" or "pay as you drive" solution. The UBI solution may provide for providing insurance coverage for individual or particular transaction based upon type of transaction, the commodity in question, information about the offerer and/or the buyer, etc. as discussed elsewhere herein.

The present embodiments may employ a UBI solution to gather valuable data and gain actuarial experience in the UBI market. The present embodiments may also establish improved restrictions and guidelines for operations of sharing a commodity the user is covered under a specific insurance policy.

In the present embodiments, the UBI solution may generate variable quotes for trips based upon a variety of factors, such as, but not limited to, type of transaction, vehicle or residence in question, route characteristics, driver qualifications, driver history, driver vehicle, driver features (such as autonomous or semi-autonomous features and systems), house history, length of stay, and/or house features. Other factors, such as, but not limited to, how often the individual driver and/or an autonomous vehicle takes trips the amount of experience that the individual operator has with that particular type of vehicle, and/or how often the residence is rented and for how long may affect the price of the quote as well.

In some further embodiments, a collection of sensor information from vehicles that the driver has driven may also include information about whether the driver is a safe driver or just been lucky so far. Safety issues may include, but are not limited to, speeds, passing distances, stoplight behavior, any accidents in the past, past damage claims, traffic violations, and other factors that may allow the systems described here to determining the potential risks with this driver.

ADDITIONAL CONSIDERATIONS

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment," "exemplary embodiment," or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A computer system of an insurance provider for generating usage-based insurance contracts between an offerer and a buyer participating in an online sharing economy, the computer system including at least one processor in communication with at least one memory device, the at least one processor is programmed to:
    host an online application for sharing transactions including at least one offer for a sharing transaction from an offerer, wherein the online application is hosted on a server of the computer system;
    receive, by the server, an election from the offerer and the buyer to participate in the online application;
    validate, by the server, the offerer and the buyer, wherein validation comprises validating the offerer based at least in part on a pre-existing insurance policy issued by the insurance provider to the offerer;
    receive, by the server, at least one offer from the offerer for sharing an item of the offerer, and wherein the offer includes a price at which the buyer can rent the item from the offerer;
    receive a selection from the buyer of the at least one offer of the offerer that is accepted by the buyer to establish a sharing transaction;
    automatically, upon acceptance of the offer by the buyer, generate a usage-based insurance contract based on the accepted offer, wherein the usage-based insurance contract is based on an amount of rental usage by the buyer;
    generate a smart contract used to record the usage-based insurance contract, wherein the smart contract comprises smart contract information including details of the sharing transaction, details of the usage-based insurance contract and coverage provided, and wherein generating the smart contract includes:
        generating a first block for a distributed ledger, the first block including a first portion of the smart contract information;
        generating a second block for the distributed ledger, the second block including a second portion of the smart contract information and a hash of the first block; and
        distributing copies of the distributed ledger across a plurality of node computing devices, wherein each of the node computing devices are capable of communicating with the server though an application programming interface; and
    transmit the usage-based insurance contract to at least one of the buyer and the associated offerer.

2. The computer system of claim 1, wherein the processor is further programmed to:
    identify based on information included in the at least one offer, an existing insurance contract for at least one of an item being offered and the offerer; and
    validate the offerer based at least in part on the existing insurance contract.

3. The computer system of claim 1, wherein the processor is further programmed to:
    receive information about the buyer including an existing insurance contract for the buyer; and
    validate the buyer based at least in part on the existing insurance contract.

4. The computer system of claim 1, wherein the processor is further programmed to transmit a plurality of offers including the at least one offer to a computer device associated with the buyer, wherein the computer device associated with the buyer is configured to display at least a portion of the plurality of offers to the buyer.

5. The computer system of claim 1, wherein the processor is further programmed to generate a transaction contract for the sharing transaction based on the at least one offer, the associated offerer, and the buyer, wherein the transaction contract is included in the distributed ledger.

6. The computer system of claim 5, wherein the processor is further programmed to store post-transaction details of the sharing transaction in the distributed ledger.

7. The computer system of claim 1, wherein at least one item of the at least one offer is associated with an existing insurance contract between the insurance provider and the offerer.

8. The computer system of claim 1, wherein the processor is further programmed to receive an acceptance of the insurance contract, wherein the second block of the distributed ledger includes the acceptance of the insurance contract.

9. A computer-based method for generating usage-based insurance contracts between an offerer and a buyer participating in an online sharing economy, the method is implemented on an usage-based insurance management ("UBIM") computing device of an insurance provider, the UBIM computing device including at least one processor in communication with at least one memory device, the method comprising:

hosting, by the at least one processor, an online application including at least one offer for a sharing transaction from an offerer, wherein the online application is hosted on a server;

receiving, by the server, an election from the offerer and the buyer to participate in the online application;

validating, by the server, the offerer and the buyer, wherein validation comprises validating the offerer based at least in part on a pre-existing insurance policy issued by the insurance provider to the offerer;

receiving, by the server, at least one offer from the offerer for sharing an item of the offerer, and wherein the offer includes a price at which the buyer can rent the item from the offerer;

receiving, by the at least one processor, a selection from the buyer of the at least one offer of the offerer that is accepted by the buyer to establish a sharing transaction;

automatically generating, by the at least one processor upon acceptance of the offer by the buyer, a usage-based insurance contract based on the accepted offer, wherein the usage-based insurance contract is based on an amount of rental usage by the buyer;

generating a smart contract used to record the usage-based insurance contract, wherein the smart contract comprises smart contract information including details of the sharing transaction, details of the usage-based insurance contract and coverage provided, and wherein generating the smart contract includes:

generating a first block for a distributed ledger, the first block including a first portion of the smart contract information;

generating a second block for the distributed ledger, the second block including a second portion of the smart contract information and a hash of the first block; and distributing copies of the distributed ledger across a plurality of node computing devices, wherein each of the node computing devices are capable of communicating with the server though an application programming interface; and transmitting, by the at least one processor, the usage-based insurance contract to at least one of the buyer and the associated offerer.

10. The method of claim 9 further comprising:
identifying, based on information included in the at least one offer, an existing insurance contract for at least one of an item being offered and the offerer; and
validating the offerer based at least in part on the existing insurance contract.

11. The method of claim 9 further comprising:
receiving information about the buyer including an existing insurance contract for the buyer; and
validating the buyer based at least in part on the existing insurance contract.

12. The method of claim 9 further comprising transmitting a plurality of offers including the at least one offer to a computer device associated with the buyer, wherein the computer device associated with the buyer is configured to display at least a portion of the plurality of offers to the buyer.

13. The method of claim 9 further comprising generating a transaction contract for the sharing transaction based on the at least one offer, the associated offerer, and the buyer, wherein the transaction contract is included in the distributed ledger.

14. The method of claim 13 further comprising storing post-transaction details of the sharing transaction in the distributed ledger.

15. The method of claim 9, wherein at least one item of the at least one offer is associated with an existing insurance contract between the insurance provider and the offerer.

16. The method of claim 9 further comprising receiving an acceptance of the insurance contract, wherein the second block of the distributed ledger includes the acceptance of the insurance contract.

17. At least one non-transitory computer-readable storage media having computer-executable instructions embodied thereon for generating usage-based insurance contracts between an offerer and a buyer participating in an online sharing economy, wherein when executed by at least one processor of a computer system of an insurance provider, the computer-executable instructions cause the processor to:

host an online application for sharing transactions including at least one offer for a sharing transaction from an offerer, wherein the online application is hosted on a server of the computer system;

receive, by the server, an election from the offerer and the buyer to participate in the online application;

validate, by the server, the offerer and the buyer, wherein validation comprises validating the offerer based at least in part on a pre-existing insurance policy issued by the insurance provider to the offerer;

receive, by the server, at least one offer from the offerer for sharing an item of the offerer, and wherein the offer includes a price at which the buyer can rent the item from the offerer;

receive a selection from the buyer of the at least one offer of the offerer that is accepted by the buyer to establish a sharing transaction;

automatically, upon acceptance of the offer by the buyer, generate a usage-based insurance contract based on the offer, wherein the usage-based insurance contract is based on an amount of rental usage by the buyer;

generate a smart contract used to record the usage-based insurance contract, wherein the smart contract comprises smart contract information including details of the sharing transaction, details of the usage-based insurance contract and coverage provided, and wherein generating the smart contract includes:
generating a first block for a distributed ledger, the first block including a first portion of the smart contract information;
generating a second block for the distributed ledger, the second block including a second portion of the smart contract information and a hash of the first block; and
distributing copies of the distributed ledger across a plurality of node computing devices, wherein each of the node computing devices are capable of communicating with the server though an application programming interface; and
transmit the usage-based insurance contract to at least one of the buyer and the associated offerer.

18. The computer-readable storage media of claim 17, wherein the computer-executable instructions further cause the processor to:
identify based on information included in the at least one offer, an existing insurance contract for at least one of an item being offered and the offerer; and
validate the offerer based at least in part on the existing insurance contract.

19. The computer-readable storage media of claim 17, wherein the computer-executable instructions further cause the processor to:
receive information about the buyer including an existing insurance contract for the buyer; and
validate the buyer based at least in part on the existing insurance contract.

20. The computer-readable storage media of claim 17, wherein the computer-executable instructions further cause the processor to transmit a plurality of offers including the at least one offer to a computer device associated with the buyer, wherein the computer device associated with the buyer is configured to display at least a portion of the plurality of offers to the buyer.

* * * * *